United States Patent
Agrawal et al.

(10) Patent No.: US 10,986,224 B2
(45) Date of Patent: Apr. 20, 2021

(54) DYNAMIC TELEPHONE NUMBER ASSIGNMENT

(71) Applicant: Google LLC, Mountain View, CA (US)

(72) Inventors: Anurag Agrawal, Palo Alto, CA (US);
Anshul Kothari, Cupertino, CA (US);
Tao Huang, Cupertino, CA (US);
Girish Baliga, San Jose, CA (US);
Seung Yi, Mountain View, CA (US)

(73) Assignee: Google LLC, Mountain View, CA (US)

( * ) Notice: Subject to any disclaimer, the term of this patent is extended or adjusted under 35 U.S.C. 154(b) by 480 days.

(21) Appl. No.: 15/065,439

(22) Filed: Mar. 9, 2016

(65) Prior Publication Data

US 2016/0191699 A1 Jun. 30, 2016

Related U.S. Application Data

(63) Continuation of application No. 14/015,451, filed on Aug. 30, 2013, now abandoned.

(51) Int. Cl.
*H04M 3/22* (2006.01)
*G06Q 30/02* (2012.01)

(52) U.S. Cl.
CPC ........ *H04M 3/229* (2013.01); *G06Q 30/0246* (2013.01)

(58) Field of Classification Search
CPC ....... G06Q 10/06; G06Q 10/063; G06Q 30/02
See application file for complete search history.

(56) References Cited

U.S. PATENT DOCUMENTS 8,023,927 B1 9/2011 Coleman et al.
8,265,609 B2 9/2012 Deliwala et al.
(Continued)

FOREIGN PATENT DOCUMENTS

CN 1595952 A 3/2005
EP 2175406 4/2010
(Continued)

OTHER PUBLICATIONS

Mongoose Metrics, "Call tracking solutions," Mongoose Metrics [online] 2013 [captured Aug. 5, 2013]. Retrieved from the Internet <URL: http://web.archive.org/web/20130805053004/http://mongoosemetrics.com/>, 2 pages.
(Continued)

*Primary Examiner* — Bion A Shelden
(74) *Attorney, Agent, or Firm* — Fish & Richardson P.C.

(57) ABSTRACT

Methods, systems, and apparatus include computer programs encoded on a computer-readable storage medium for dynamic telephone number assignment. A method includes: providing a content item to a user device, the content item including a control for initiating a call to a content sponsor associated with the content item; assigning a telephone number from a pool to the content item; receiving a control interaction indication; facilitating a connection between the user and the content sponsor based on the interaction; storing an association between a user identifier, the telephone number, and a content sponsor identifier such that future calls from the user to the telephone number can be routed to the content sponsor, even after the telephone number has been returned to the pool; and linking a content item impression with the connection such that a report can be generated that shows an effectiveness of the content item impression.

13 Claims, 6 Drawing Sheets

(56) References Cited

U.S. PATENT DOCUMENTS

| | | | |
|---|---|---|---|
| 8,312,042 B2 | 11/2012 | LeBeau et al. | |
| 8,515,047 B1 | 8/2013 | Vanier et al. | |
| 2005/0251445 A1* | 11/2005 | Wong | G06Q 30/02 705/14.69 |
| 2007/0064889 A1* | 3/2007 | Michonski | G06Q 30/02 379/112.01 |
| 2007/0124206 A1 | 5/2007 | Faber et al. | |
| 2007/0127650 A1* | 6/2007 | Altberg | G06Q 30/02 379/114.13 |
| 2007/0143182 A1 | 6/2007 | Faber et al. | |
| 2007/0226061 A1 | 9/2007 | Chen et al. | |
| 2010/0069096 A1 | 3/2010 | Poola et al. | |
| 2011/0066498 A1* | 3/2011 | Wojcicki | G06Q 30/02 705/14.55 |

FOREIGN PATENT DOCUMENTS

| | | | | |
|---|---|---|---|---|
| JP | 2007148833 A * | 6/2007 | | |
| KR | 10-2012-0050941 | 5/2012 | | |
| WO | WO 2009016740 A1 * | 2/2009 | | G06Q 30/02 |
| WO | 2011/129346 | 10/2011 | | |

OTHER PUBLICATIONS

Freespee, "Making phone calls count," Freespee [online] 2013 [captured Aug. 5, 2013]. Retrieved from the Internet: <URL: http://web.archive.org/web/20130805211140/http://www.freespee.com/>, 4 pages.

International Search Report and Written Opinion in International Application No. PCT/US2014/053477, dated Apr. 24, 2015, 17 pages.

International Preliminary Report on Patentability in International Application No. PCT/US2014/053477, dated Mar. 1, 2016, 12 pages.

Extended European Search Report issued in European Application No. 14771655.9-1958/3039849, dated Dec. 21, 2016, 7 pages.

Japanese Office Action in Application No. JP 2016-537906, dated May 15, 2017 (English Summary of key points of office action included), 16 total pages.

Australian Office Action issued in Application No. 2014312140, dated Nov. 13, 2017, 4 pages.

European Office Action issued in Application No. 14771655.9, dated Feb. 13, 2018, 6 pages.

Australian Office Action issued in Application No. 2014312140, dated Dec. 8, 2017, 3 pages.

Canadian Office Action issued in Application No. 2922674, dated Jan. 30, 2019, 6 pages.

Korean Office Action issued in Application No. 10-2016-7008364, dated Aug. 9, 2017, 7 pages (English Translation).

Chinese Office Action issued in Application No. 201480048038.4, dated Apr. 3, 2018, 20 pages (with English Translation).

CA Office Action in Canadian Application No. 2,922,674, dated Jan. 27, 2020, 6 pages.

* cited by examiner

Content Item Effectiveness Report

Content Sponsor: 123
Period: May 1 – May 31, 2013
Campaign: Campaign A

| Content Group | Content Item | # of Impressions | # of Calls | # of Conversions |
|---|---|---|---|---|
| A | 1 | 2,843 | 432 | 211 |
|   | 2 | 2,421 | 211 | 54 |
| Subtotal: |   | 5,264 | 643 | 265 |
| B | 3 | 1,812 | 89 | 33 |
|   | 4 | 1,922 | 112 | 56 |
| Subtotal: |   | 3,734 | 201 | 89 |
| Total: |   | 8,998 | 844 | 354 |

DYNAMIC TELEPHONE NUMBER ASSIGNMENT

CROSS-REFERENCE TO RELATED APPLICATIONS

This application is a continuation application of and claims priority to U.S. application Ser. No. 14/015,451, filed on Aug. 30, 2013, the entire contents of which are hereby incorporated by reference.

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for dynamic telephone number assignment. The method comprises: providing an impression including providing a content item for presentation on a device associated with a user, the content item including a control for initiating a call to a content sponsor associated with the content item; assigning a telephone number from a pool of available telephone numbers to the content item, wherein assigning includes associating the telephone number with the content item; receiving an indication of an interaction with the control; facilitating a connection between the user and the content sponsor based on the interaction; storing an association between an identifier associated with the user, the assigned telephone number and an identifier for the content sponsor such that future calls from the user to the telephone number can be routed to the content sponsor, even after the assigned telephone number has been returned to the pool of available telephone numbers; and linking an impression of the content item with the connection such that a report can be generated that shows an effectiveness of the impression of the content item.

In general, another aspect of the subject matter described in this specification can be implemented in computer program products. A computer program product is tangibly embodied in a computer-readable storage device and comprises instructions. The instructions, when executed by a processor, cause the processor to: provide an impression including providing a content item for presentation on a device associated with a user, the content item including a control for initiating a call to a content sponsor associated with the content item; assign a telephone number from a pool of available telephone numbers to the content item, wherein assigning includes associating the telephone number with the content item; receive an indication of an interaction with the control; facilitate a connection between the user and the content sponsor based on the interaction; store an association between an identifier associated with the user, the assigned telephone number and an identifier for the content sponsor such that future calls from the user to the telephone number can be routed to the content sponsor, even after the assigned telephone number has been returned to the pool of available telephone numbers; and link an impression of the content item with the connection such that a report can be generated that shows an effectiveness of the impression of the content item.

In general, another aspect of the subject matter described in this specification can be implemented in systems. A system includes a content management system, a telephony system, and an available telephone number pool. The content management system is configured to: provide an impression including providing a content item for presentation on a device associated with a user, the content item including a control for initiating a call to a content sponsor associated with the content item; and receive an indication of an interaction with the control. The telephony system is configured to: assign a telephone number from the available telephone number pool to the content item, wherein assigning includes associating the telephone number with the content item; facilitate a connection between the user and the content sponsor based on the interaction with the control; store an association between an identifier associated with the user, the assigned telephone number and an identifier for the content sponsor such that future calls from the user to the telephone number can be routed to the content sponsor, even after the assigned telephone number has been returned to the available telephone number pool; and link an impression of the content item with the connection such that a report can be generated that shows an effectiveness of the impression of the content item.

These and other implementations can each optionally include one or more of the following features. The device can be a mobile device. The content item can be an advertisement. The assigning can occur either at a time of impression or after receiving the indication of an interaction. The control can be a button that does not include a visible telephone number. The pool can include a plurality of telephone numbers which may or may not have been previously assigned to other content items but are now available for assignment. The assigned telephone number can be returned back to the pool after either a predetermined amount of time after assignment to a content item, or after a pre-determined amount of time after assignment without receipt of an interaction by a user. The interaction can be a click and facilitating can include receiving a call from the user based on the interaction and connecting the received call to a telephone number associated with the content sponsor. The identifier associated with the user can be a caller telephone number. A call to a telephone number that is in the pool can be received. A caller number can be identified for the received call. A determination can be made regarding whether the caller number is the same as the stored caller number and when so, the call can be connected to the content sponsor. Assigning can include assigning a number to the content item that has historically been previously assigned to the content sponsor.

Particular implementations may realize none, one or more of the following advantages. A user interaction with a content item can be associated with a call by a user to a phone number associated with the content item. A determination can be made that a call was generated as a result of an interaction with a content item rather than from as a result of some other action. A content sponsor can receive a report which displays how many calls were generated from each content item in a content campaign. A content sponsor can optimize a content campaign that includes multiple content items based on how many calls were generated from each content item. A content-interaction to call-placed mapping can be provided for a first number of content items using a pool including a second number of telephone numbers, wherein the first number is significantly larger (e.g., at least an order of magnitude larger) than the second number.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A content management system can provide a content item for presentation on a device associated with a user, wherein the content item includes a control for initiating a call to a content sponsor or a designated entity associated with the content item. The content management system can assign (e.g., dynamically) a telephone number from a pool of available telephone numbers to the content item which can include associating the telephone number with the content item. An indication of an interaction with the control can be received, and based on such an interaction, a connection between a user that initiated the interaction and the content sponsor can be facilitated. An association between an identifier associated with the user, the assigned telephone number, and an identifier for the content sponsor can be stored such that future calls from the user to the telephone number can be routed to the content sponsor. An impression of the content item can be linked with the connection such that a report can be generated that shows an effectiveness of the impression of the content item.

For situations in which the systems discussed here collect information about users, or may make use of information about users, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be manipulated in one or more ways before it is stored or used, so that certain information about the user is removed. For example, a user's identity may be manipulated so that no identifying information can be determined for the user, or a user's geographic location may be generalized where location information is obtained (such as to a city, ZIP code, or state level), so that a particular location of a user cannot be determined. Thus, the user may have control over how information about the user is collected and used by a content server.

Figure 1:
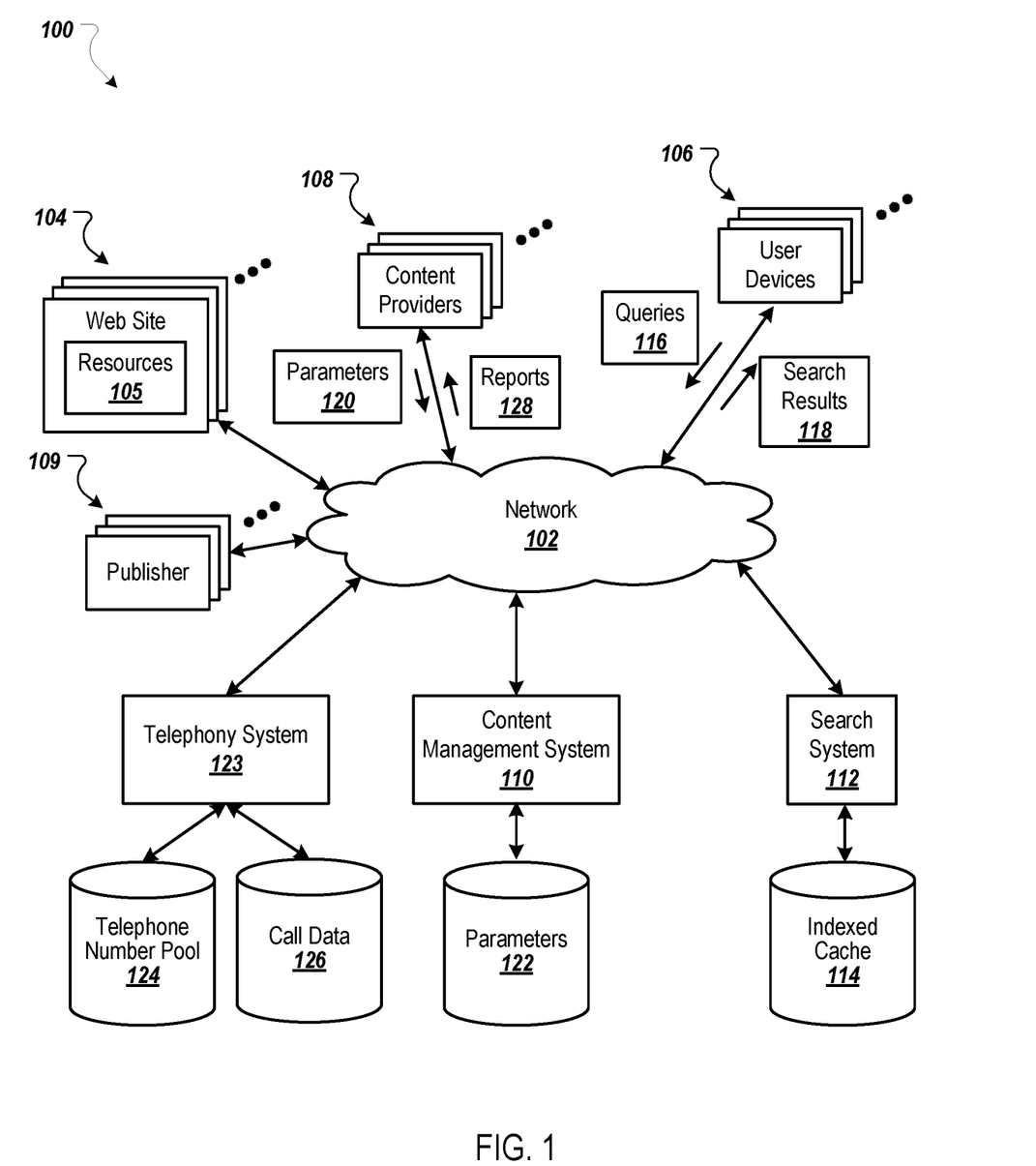
FIG. 1 is a block diagram of an example environment for providing content to a user.

FIG. 1 is a block diagram of an example environment 100 for providing content to a user. The example environment 100 includes a network 102, such as a local area network (LAN), a wide area network (WAN), the Internet, or a combination thereof. The network 102 connects websites 104, user devices 106, content providers 108, publishers, and a content management system 110. The example environment 100 may include many thousands of websites 104, user devices 106, and content providers 108. The content management system 110 may be used for selecting and providing content in response to requests for content. The content providers 108 can be, for example, advertisers. Other types of content providers are possible.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, videos, images and sounds, that may include embedded information (such as meta-information hyperlinks) and/or embedded instructions (such as scripts).

A user device 106 is an electronic device that is under control of a user and is capable of requesting and receiving resources 105 over the network 102. Example user devices 106 include personal computers, tablet computers, mobile communication devices (e.g., smartphones), televisions, set top boxes, personal digital assistants and other devices that can send and receive data over the network 102. A user device 106 typically includes one or more user applications, such as a web browser, to facilitate the sending and receiving of data over the network 102. The web browser can interact with various types of web applications, such as a game, a map application, or an e-mail application, to name a few examples.

A user device 106 can request resources 105 from a website 104. In turn, data representing the resource 105 can be provided to the user device 106 for presentation by the user device 106. User devices 106 can also submit search queries 116 to the search system 112 over the network 102. In response to a search query 116, the search system 112 can, for example, access the indexed cache 114 to identify resources 105 that are relevant to the search query 116. The search system 112 identifies the resources 105 in the form of search results 118 and returns the search results 118 to the user devices 106 in search results pages. A search result 118 is data generated by the search system 112 that identifies a resource 105 that is responsive to a particular search query 116, and includes a link to the resource 105. An example search result 118 can include a web page title, a snippet of text or a portion of an image extracted from the web page, and the URL (Unified Resource Location) of the web page.

The data representing the resource 105 or the search results 118 can also include data specifying a portion of the resource 105 or search results 118 or a portion of a user display (e.g., a presentation location of a pop-up window or in a slot of a web page) in which other content (e.g., advertisements) can be presented. These specified portions of the resource or user display are referred to as slots or impressions. An example slot is an advertisement slot.

When a resource 105 or search results 118 are requested by a user device 106, the content management system 110 may receive a request for content to be provided with the resource 105 or search results 118. The request for content can include characteristics of one or more slots or impressions that are defined for the requested resource 105 or search results 118. For example, a reference (e.g., URL) to the resource 105 or search results 118 for which the slot is defined, a size of the slot, and/or media types that are available for presentation in the slot can be provided to the content management system 110. Similarly, keywords associated with a requested resource ("resource keywords") or a search query 116 for which search results 118 are requested can also be provided to the content management system 110 to facilitate identification of content that is relevant to the resource or search query 116.

Based, for example, on data included in the request for content, the content management system 110 can select content items that are eligible to be provided in response to the request, such as content items having characteristics matching the characteristics of a given slot. As another example, content items having selection criteria (e.g., keywords) that match the resource keywords or the search query 116 may be selected as eligible content items by the content management system 110. One or more selected content items can be provided to the user device 106 in association with providing an associated resource 105 or search results 118.

In some implementations, the content management system 110 can select content items based at least in part on results of an auction. For example, content providers 108 can provide bids specifying amounts that the content providers 108 are respectively willing to pay for presentation of their content items. In turn, an auction can be performed and the slots can be allocated to content providers 108 according, among other things, to their bids and/or the relevance of a content item to content presented on a page hosting the slot or a request that is received for the content item. For example, when a slot is being allocated in an auction, the slot can be allocated to the content provider 108 that provided the highest bid or a highest auction score (e.g., a score that is computed as a function of a bid and/or a quality measure). When multiple slots are allocated in a single auction, the slots can be allocated to a set of bidders that provided the highest bids or have the highest auction scores.

In some implementations, some content providers 108 prefer that the number of impressions allocated to their content and the price paid for the number of impressions be more predictable than the predictability provided by an auction. For example, a content provider 108 can increase the likelihood that its content receives a desired or specified number of impressions, for example, by entering into an agreement with a publisher 109, where the agreement requires the publisher 109 to provide at least a threshold number of impressions (e.g., 1,000 impressions) for a particular content item provided by the content provider 108 over a specified period (e.g., one week). In turn, the content provider 108, publisher 109, or both parties can provide data to the content management system 110 that enables the content management system 110 to facilitate satisfaction of the agreement.

For example, the content provider 108 can upload a content item and authorize the content management system 110 to provide the content item in response to requests for content corresponding to the website 104 of the publisher 109. Similarly, the publisher 109 can provide the content management system 110 with data representing the specified time period as well as the threshold number of impressions that the publisher 109 has agreed to allocate to the content item over the specified time period. Over time, the content management system 110 can select content items based at least in part on a goal of allocating at least a minimum number of impressions to a content item in order to satisfy a delivery goal for the content item during a specified period of time.

A content provider 108 or content sponsor can create a content campaign associated with one or more content items using tools provided by the content management system 110. For example, the content management system 110 can provide one or more account management user interfaces for creating and managing content campaigns. The account management user interfaces can be made available to the content provider 108, for example, either through an online interface provided by the content management system 110 or as an account management software application installed and executed locally at a content provider's client device.

A content provider 108 can, using the account management user interfaces, provide campaign parameters 120 which define a content campaign. The content campaign can be created and activated for the content provider 108 according to the parameters 120 specified by the content provider 108. The campaign parameters 120 can be stored in a parameters data store 122. Campaign parameters 120 can include, for example, a campaign name, a preferred content network for placing content, a budget for the campaign, start and end dates for the campaign, a schedule for content placements, content (e.g., creatives), bids, and selection criteria. Selection criteria can include, for example, a language, one or more geographical locations or websites, and/or one or more selection terms.

Some or all content items associated with a content provider 108 can be associated with a telephone number of the content provider 108 or another designated entity. For example, a content item can include a control (e.g., a "call" button) for initiating a call to the content provider 108. A content provider 108 may desire to know which calls originated from or are a result of presentation of a specific content item. A solution of assigning a unique telephone number to each content item may not be practical since the number of content items provided by the content management system 110 may exceed a number of available telephone numbers.

Rather than associating a unique telephone number with each content item, a pool of telephone numbers can be used. For example, the control included in a content item can be configured to place a call, but not display a specific telephone number. The user can interact with (e.g., select or click) the control to initiate a call to the content provider 108 or other designated entity associated with the content item. In response to the control interaction, a request for a forwarding telephone number can be sent to a telephony system 123. The telephony system 123 can select an available forwarding number from a telephone number pool 124 and, in some implementations, can provide the selected forwarding number to the user device 106 of the user.

In some implementations, the user device 106 can initiate a call to the forwarding number and the call can be received by the telephony system 123. The telephony system 123 can route the call to the telephone number associated with the content provider 108 or the designated entity. The telephony system 123 can associate the impression of the content item with the call to the telephone number of the content provider 108, such as in a call data datastore 126.

The telephony system 123 can generate one or more reports which include information which indicates which calls to the content provider 108 or designated entity were generated from which content items. The one or more reports can be provided to the content provider 108, as illustrated by reports 128.

Figure 2:
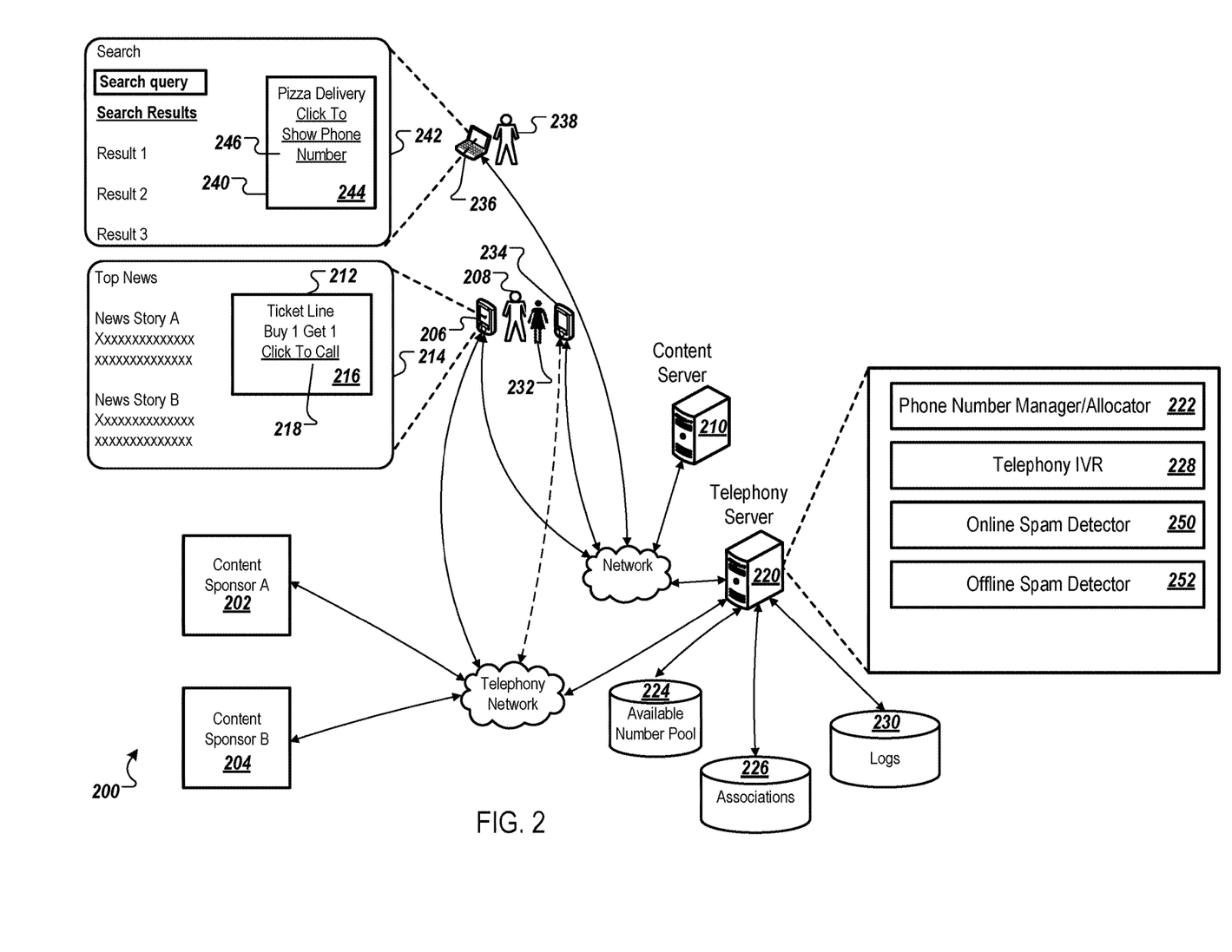
FIG. 2 is a block diagram of an example system for dynamic telephone number assignment.

FIG. 2 is a block diagram of an example system 200 for dynamic phone number assignment. Content sponsors, such as content sponsors 202 and 204, may desire, as part of respective content campaigns, to track effectiveness of content items included in the respective content campaigns. For example, some or all content items included in a content campaign for the content sponsor 202 may be configured to facilitate a connection with (e.g., placing a call to) the content sponsor 202. The user, for example, can call the content sponsor 202 to make a purchase, inquire about a product or service, etc. The content sponsor 202 may desire to track, for example, how many calls to the content sponsor 202 are generated from each content item included in the content campaign and to track how many conversions (e.g., completed purchases) result from the calls generated from each content item.

A content item included in the content campaign of the content sponsor 202 can be provided to a user in response to a request for content from a user device. For example, a mobile user device 206 of a user 208 can send a request for content to a content server 210 for a content item to be presented in a content slot 212 of a web page 214 that is presented on the user device 206. The content server 210 can select a content item to be provided to the user device 206 and the selected content item can be presented in the content slot 212, as illustrated by a content item 216.

The content item 216 includes a control 218 for initiating a call to the content sponsor 202 or other designated entity. The user 208 can interact with (e.g., select or click) the control 218. In response to an interaction with the control 218, a request can be sent to a telephony server 220. The request sent to the telephony server 220 can include a unique identifier (e.g., an impression identifier) corresponding to the presentation of the content item 216 in the content slot 212.

A phone number manager/allocator 222 included in the telephony server 220 can select an available forwarding telephone number from an available number pool 224. The available number pool 224 can include a set of forwarding telephone numbers that are available to be assigned in response to interaction with a control such as the control 218. The phone number manager/allocator 222 can store a first type of association between the impression identifier associated with the impression of the content item 216, the selected forwarding telephone number, and a telephone number associated with the content sponsor 202, in an associations data store 226.

In some implementations, the telephony server 220 can send the selected forwarding telephone number to the user device 206. In some implementations, the user device 206 can automatically dial the forwarding telephone number in response to receiving the forwarding telephone number. In some implementations, the user device 206 can load a dialer on the user device 206, and using the received forwarding telephone number, initiate a call to the forwarding telephone number (e.g., by selecting a dial control on the user device 206). In some implementations, the user device 206 displays the forwarding telephone number and the user 206 enters the forwarding telephone number into the dialer and initiates a call to the forwarding telephone number. In some implementations, the telephony server 220 can place the call using the selected forwarding telephone number and connect the user device 206 to the call. Other dialing options are possible.

In some implementations, when the forwarding telephone number is dialed, the call is received by a telephony IVR (Interactive Voice Response) system 228. The telephony IVR system 228 bridges the call placed to the forwarding telephone number to a telephone number associated with the content sponsor 202 or designated entity. In response to receiving the call using the forwarding number, the telephony server 220 can store, in the associations data store 226, a second type of association between a caller identifier associated with the user device 206, the forwarding telephone number, and the telephone number of the content sponsor 202 or designated entity. A record of the call can be stored in a logs data store 230, and the record can include, for example, the impression identifier, the forwarding telephone number, an identifier of the content sponsor 202 or designated entity (e.g., the telephone number of the content sponsor 202), the caller identifier, a date and time of the call, and/or a call duration.

After the telephony IVR system 228 connects the call to the content sponsor 202 or designated entity, the phone number manager/allocator 222 can return the forwarding telephone number to the available number pool 224, and the forwarding number can be assigned to an impression of another content item, such as a content item associated with another content sponsor (e.g., the content sponsor 204), in response to a user interacting with a control in the other content item. In some implementations, the phone number manager/allocator 222 maintains the first type of association between the selected forwarding number and the telephone number of the content sponsor 202 for a first predetermined period of time (e.g., thirty minutes to three days) after the forwarding telephone number is provided to the user device 206. Such an association can be maintained, for example, so that if the user 208 happens to dial the forwarding telephone number from a different calling device, the call will still be connected to the content sponsor 202 or designated entity. For example, the user 208 may see the forwarding telephone number displayed on the user device 206 and may dial the forwarding number from the user device 206 or alternatively from a different calling device. As another example, the user 208 may share the forwarding number with another user (e.g., a user 232), and the user 232 may dial the forwarding number, such as with a user device 234.

In some implementations, the phone number manager/allocator 222 maintains the second type of association between the caller identifier associated with the user device 206, the selected forwarding telephone number, and the telephone number of the content sponsor 202 for a second predetermined period of time (e.g., ninety days to six months) after the telephony IVR system 228 connects the call to the content sponsor 202 or designated entity. Such an association can be maintained, for example, so that if the user 208 dials the forwarding number during the second (e.g., longer) predetermined period of time, the call will connect to the content sponsor 202 or designated entity. This association allows for calls that are received from a caller having the stored caller identifier to be routed to the content sponsor 202 or designated entity even when the forwarding number has been returned to the available number pool 224 and has been potentially reassigned to one or more other content impressions that may be associated with one or more different content sponsors. In some implementations, the phone number manager/allocator 222 maintains an association between the forwarding telephone number, the telephone number of the content sponsor 202, and a caller identifier associated with any calling device (e.g., the user device 234) that places a call to the forwarding number in the first predetermined time period, such that subsequent calls received to the forwarding number from such calling devices within the second predetermined time period are connected to the content sponsor 202

In some implementations, the first predetermined time period is a short time period as compared to the second predetermined time period. For example, the first predetermined time period can be one hour and the second predetermined time period can be ninety days. The first predetermined time period can be short, for example, to allow forwarding telephone numbers to be returned to the pool to make the returned forwarding telephone numbers available for assignment to other content impressions shown to potentially other users.

In some implementations, a content item configured to facilitate a connection to a content sponsor (e.g., the content sponsor 204) can be displayed on a user device which does not have calling capability (e.g., a laptop user device 236 of a user 238). For example, the user device 236 can send a request for content to the content server 210 for a content item to be presented in a content slot 240 of a web page 242 that is presented on the user device 236. The content server 210 can select a content item to be provided to the user device 236 and the selected content item can be presented in the content slot 240, as illustrated by a content item 244.

The content item 244 includes a control 246 for displaying a telephone number associated with the content sponsor 204. The user 238 can interact with (e.g., select or click) the control 246. In response to an interaction with the control 246, a request can be sent to the telephony server 220. The request sent to the telephony server 220 can include an impression identifier corresponding to the presentation of the content item 244 in the content slot 240.

The phone number manager/allocator 222 can select an available forwarding telephone number from the available number pool 224. The phone number manager/allocator 222 can store an association between the impression identifier associated with the impression of the content item 244, the forwarding telephone number selected in response to the request received from the user device 236, and a telephone number associated with the content sponsor 204, in the associations data store 226. The telephony server 220 can send the selected forwarding telephone number to the user device 206. The forwarding telephone number can be displayed in the content item 244. The phone number manager/allocator 222 can store an association between the selected forwarding telephone number and the telephone number associated with the content sponsor 204 for the first predetermined period of time. During the first predetermined period of time, if a call is received by the telephony IVR system 228 to the selected forwarding number, the telephony IVR system 228 can connect the call to the telephone number associated with the content sponsor 204.

In some implementations, the phone number manager/allocator 222 determines, in response to a received request that is associated with a content item from a content sponsor, whether a forwarding number has already been assigned to an impression of that content item in response to a previous request. If a forwarding number has already been assigned to an impression of that content item, the phone number manager/allocator 222 can select the same forwarding number in response to the current request. Selecting the same forwarding number can result in the same or a same set of forwarding numbers being selected for a particular content sponsor.

The telephony server 220 can include an online spam detector 250 and an offline spam detector 252, to protect, for example, against malicious attempts to deplete the available number pool 224. The online spam detector 250 can be used, for example, to detect and prevent denial of service attacks.

The offline spam detector 252 can periodically (e.g., daily) evaluate the logs datastore 230, for example, to evaluate a volume of activity from a same IP (Internet Protocol) address or IP address range and/or from a same telephone number. When, for example, a greater than a threshold number of requests are received from a same IP address, but none or less than a threshold of valid calls are made in association with those requests, the content server 210 can be configured to not send content items to the IP address and/or the phone number manager/allocator 222 can be configured to not provide a forwarding number in response to requests received from the IP address. The online spam detector 250 can be updated in response to determinations made by the offline spam detector 250. In response to offline or online spam detection, forwarding numbers determined to be associated with invalid activity can be returned to the available number pool 224.

Figure 3:
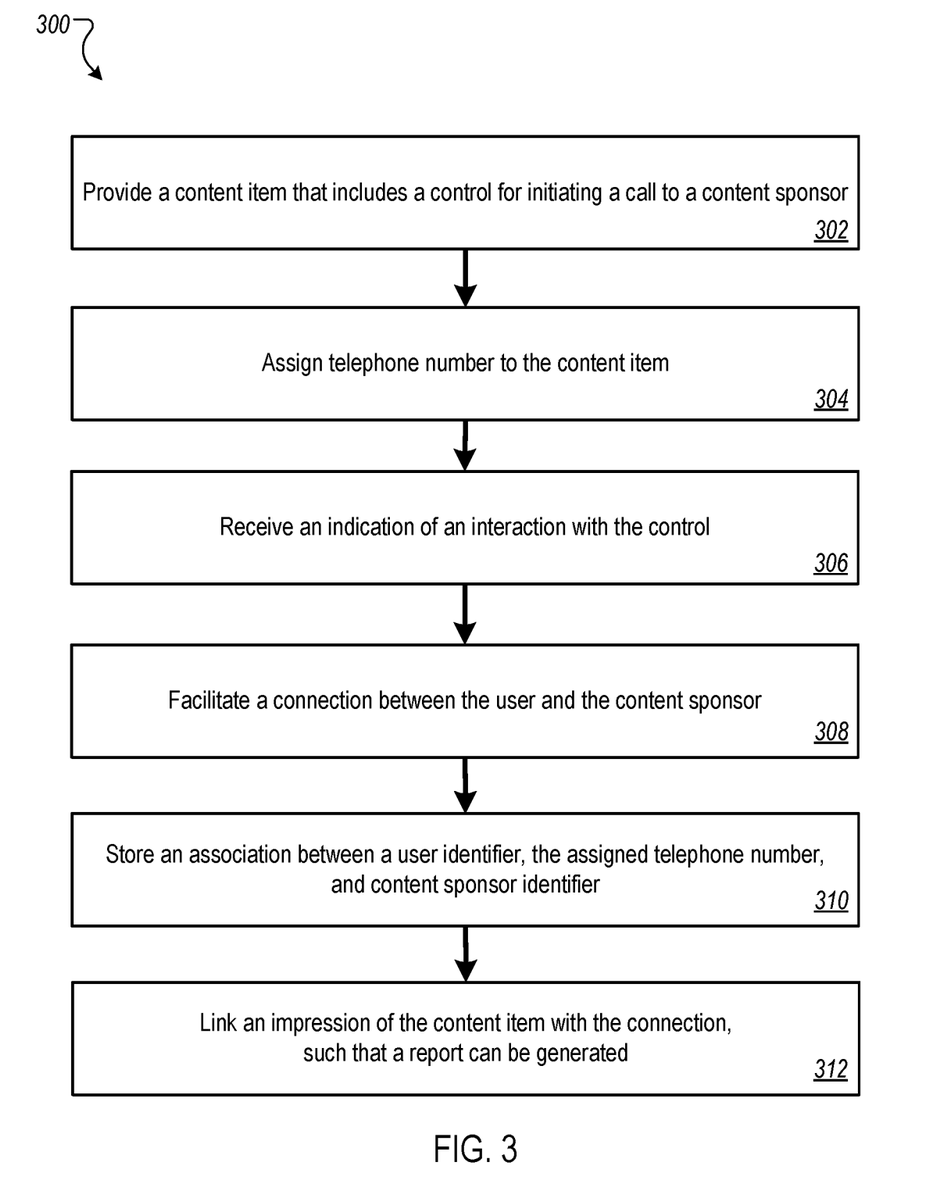
FIG. 3 is a flowchart of an example process for dynamic telephone number assignment.

FIG. 3 is a flowchart of an example process 300 for dynamic telephone number assignment. The process 300 can be performed, for example, by the telephony system 123 described above with respect to FIG. 1, or the telephony server 220 described above with respect to FIG. 2.

An impression is provided (302), including providing a content item for presentation on a device associated with a user, the content item including a control for initiating a call to a content sponsor or designated entity associated with the content item. The device can be, for example, a mobile device with call-making capability. The content item can be, for example, an advertisement or some other type of content item. The control can be, for example, a button or a link. The button or link can include a caption which does not include a displayed telephone number.

A telephone number is assigned from a pool of available telephone numbers to the content item (304), wherein the assigning includes associating the telephone number with the content item. The assigning can occur, for example, at the time the impression of the content item is provided. As described below, the assigning can occur after an indication of an interaction with the control is received. The pool can include a plurality of telephone numbers which may or may not have been previously assigned to other content items but are now available for assignment. In some implementations, a number can be assigned to the content item that has historically been previously assigned to the content sponsor.

An indication of an interaction with the control is received (306). The interaction can be, for example, a selection (e.g., click) of the control. In some implementations, the telephone number is assigned to the content item in response to the interaction. The assigned telephone number can be provided to the device associated with the user in response to the interaction. In some implementations, a call is received from the device based on the interaction.

A connection between the user and the content sponsor is facilitated, based on the interaction (308). For example, a call received from the device can be connected to a telephone number associated with the content sponsor or other designated entity.

An association is stored between an identifier associated with the user, the assigned telephone number, and an identifier for the content sponsor (310), such that future calls from the user to the telephone number can be routed to the content sponsor, even after the assigned telephone number has been returned to the pool of available telephone numbers. The association can be maintained, for example, for a predetermined period of time (e.g., ninety days, six months).

An impression of the content item is linked with the connection (312), such that a report can be generated that shows an effectiveness of the impression of the content item. The report can be provided, for example, to the content sponsor. The report can be provided on demand to the content sponsor and/or the report can be provided automatically on a periodic basis (e.g., monthly).

Figure 4:
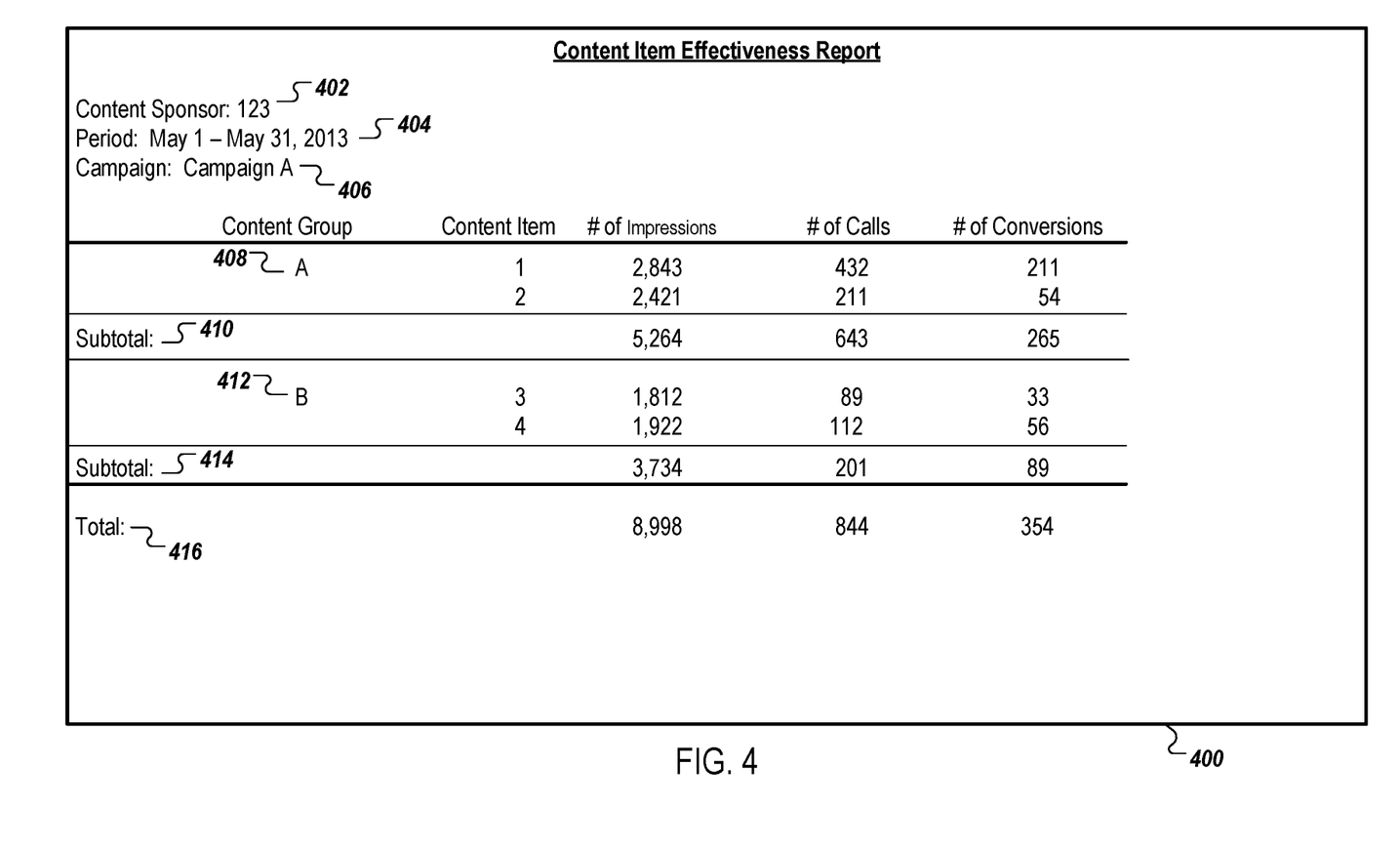
FIG. 4 illustrates an example content item effectiveness report.

FIG. 4 illustrates an example content item effectiveness report 400. The report 400 is provided to a content sponsor "123", for a period of May 1 to May 31, 2013, for a campaign "A", as indicated by labels 402, 404, and 406, respectively. A section 408 includes information for a content item "1" and a content item "2" included in a content group "A" that is included in the campaign "A". For example, the section 408 includes information that indicates that out of 2,843 impressions, the content item "1" generated four hundred thirty two calls to the content sponsor, with two hundred eleven of those calls resulting in a conversion, and that out of 2,421 impressions, the content item "2" generated two hundred eleven calls to the content sponsor, with fifty four of those calls resulting in a conversion. A subtotal section 410 displays totals for the content group "A".

A section 412 includes information about a content item "3" and a content item "4" included in a content group "B". For example, out of 1,812 impressions, the content item "3" generated eighty nine calls to the content sponsor, with thirty three calls resulting in a conversion, and out of 1,922 impressions, the content item "4" generated one hundred twelve calls to the content sponsor, with fifty six calls resulting in a conversion. A subtotal section 414 displays totals for the content group "B" and a totals section 416 displays totals for the campaign "A".

The content sponsor "123" can use the report 400, for example, to optimize the content campaign "A". For example, the content sponsor can determine that the content items in the content group "A" have been more effective than the content items included in the content group "B". The content sponsor can determine, for example, to increase a campaign budget portion allocated to the content group "A" content items, can determine to reconfigure the content items in the content group "B" (e.g., change bids, change creative content) to attempt to make the content items in the content group "B" more effective, or can determine to remove the content items included in the content group "B" from the campaign "A". In some implementations, some or all such optimizations can be performed automatically. For example, a bid for a content item can be automatically adjusted based on a rate of call generation and/or a rate of conversion for a time period.

Figure 5:
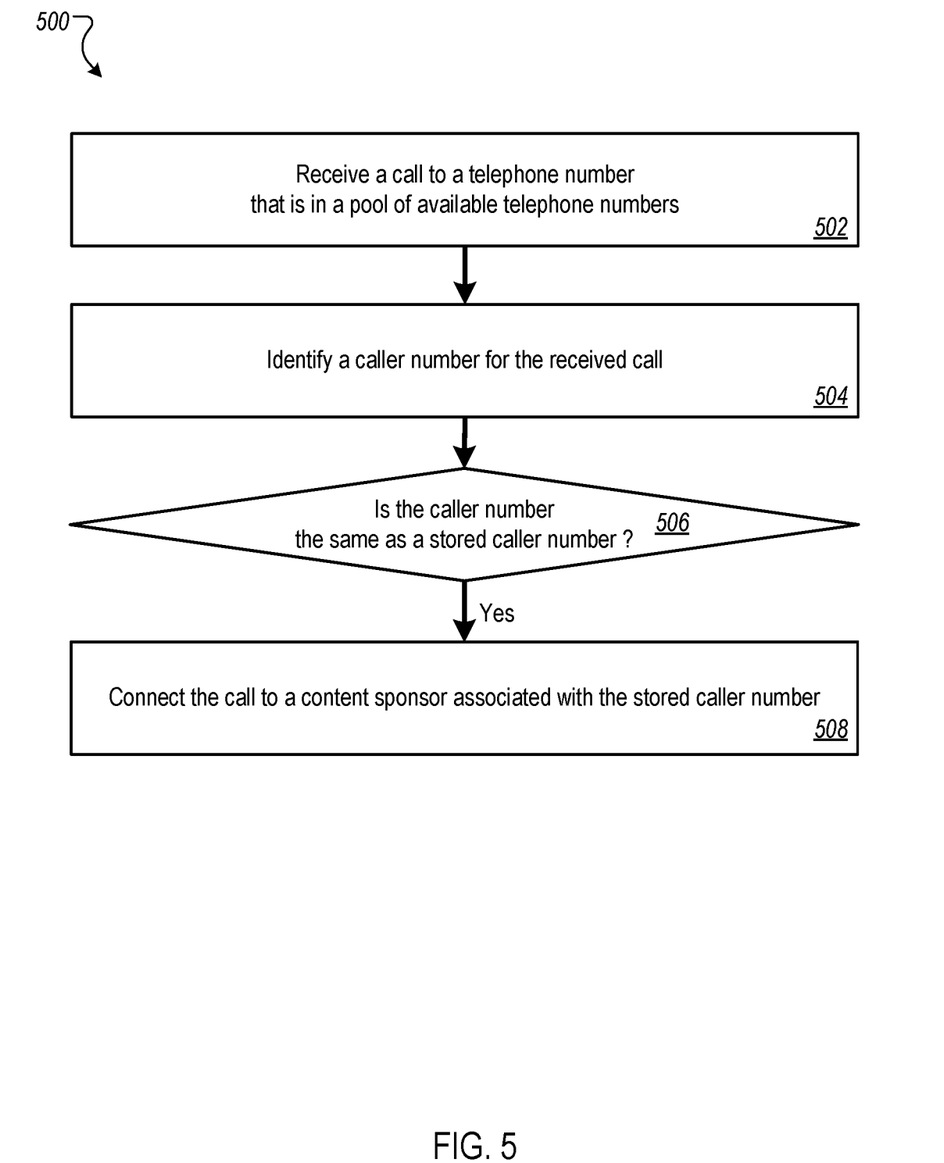
FIG. 5 is a flowchart of an example process for connecting a telephone call.

FIG. 5 is a flowchart of an example process 500 for connecting a telephone call. The process 500 can be performed, for example, by the telephony system 123 described above with respect to FIG. 1, or the telephony server 220 described above with respect to FIG. 2.

A call to a telephone number that is in a pool of available telephone numbers is received (502). For example, the telephone number can be included in the telephone number pool 124. The call can be received, for example, by the telephony system 123, from a user device 106, such as a mobile device. The user, for example, can interact with a call control included in a presented content item. In association with the receipt of the call, an impression identifier of the content item can be received.

A caller number for the received call is identified (504). The caller number can be, for example, a caller identification number.

A determination is made as to whether the caller number is the same as a stored caller number (506). For example, a determination can be made as to whether the caller number is included in a set of stored associations, where the stored associations each associate a caller number, an impression identifier of an impression of a previously presented content item, a first telephone number associated with a content sponsor, and a second telephone number. If the caller number is included in a stored association, the stored association that includes the caller number and the impression identifier can be identified. The presence of a stored association between a caller number, a telephone number of a content sponsor or other designated entity, an impression identifier, and a second telephone number can indicate that the second telephone number was previously associated with (e.g., assigned to) the caller number and the impression identifier.

When the caller number matches a stored caller number which is associated with a stored impression identifier that matches the received impression identifier, a call to a content sponsor or other designated entity associated with the stored caller number is connected (508). For example, the telephone number associated with the stored caller number can be accessed using the identified stored association. Connecting the call to the content sponsor associated with the stored caller number can create a consistent user experience for the user—for example, the user may have previously called the content sponsor using a particular assigned telephone number and expects a call placed to that number will result in a connection to the same content sponsor.

Figure 6:
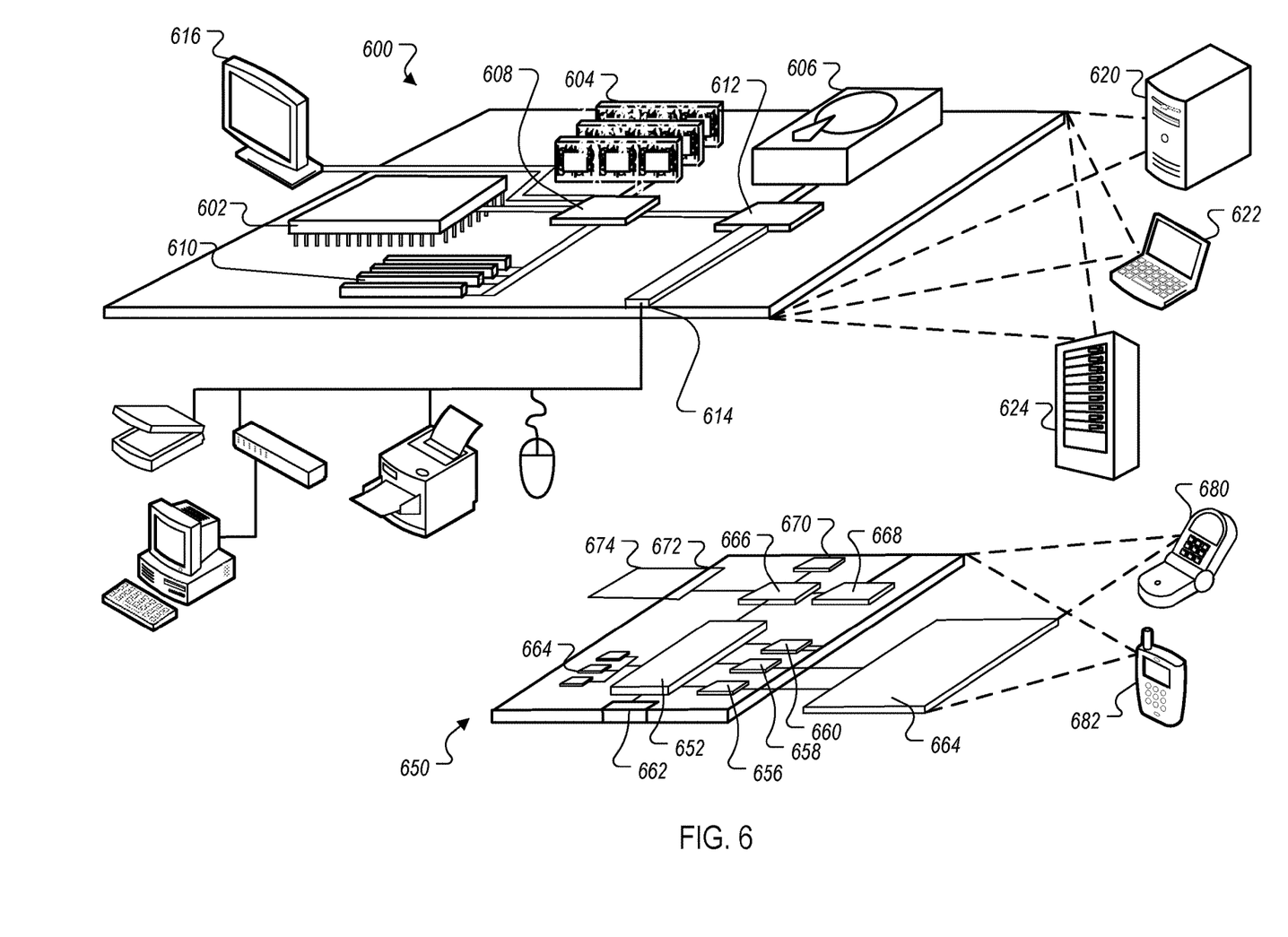
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. The computer-readable medium is not a propagating signal. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is illustrative only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:

providing a data structure associated with a pool of forwarding telephone numbers, the forwarding telephone numbers being initially available for assigning to content items that are presented to users, wherein the data structure includes entries for forwarding telephone numbers that have been assigned in a previous time period and wherein an entry includes an identifier for a forwarding telephone number from the pool that was assigned based on an impression of a content item to a user, an identifier for the user, a telephone number of a content sponsor, and an identifier for the content sponsor for the content item, wherein the data structure includes plural entries for a same forwarding telephone number with each entry including a different combination of user and content sponsor identifiers;

identifying an opportunity to deliver a content item to a user;

dynamically, by one or more processors, assigning a forwarding telephone number from the pool of forwarding telephone numbers to the content item, wherein assigning includes evaluating by the one or more processors, the data structure to locate a given forwarding telephone number that has not been previously assigned to a combination of the user and a content sponsor of the content item, and associating the forwarding telephone number with the content item;

receiving an indication of a user interaction with a control that initiates a call to the given forwarding telephone number, wherein the received indication includes an identifier corresponding to a presentation of the content item on the device;

facilitating, based on the initiation of the call to the given forwarding telephone number, a call between the user and the content sponsor of the content item, wherein the call is initiated based on the user interaction and the call is initially made to the forwarding telephone number that was assigned to the content item, the facilitating including connecting the call to the forwarding number to the content sponsor at the telephone number of the content sponsor;

storing, in the data structure based on the user interaction with the control, an association between the user, the assigned forwarding telephone number and the sponsor of the content item, wherein the association causes calls from the user to the forwarding telephone number to be routed to the telephone number of the content sponsor of the content item even after the assigned forwarding telephone number has been reassigned;

after storing the association, reassigning the forwarding telephone number to a different content item provided by a different content sponsor;

after reassigning the forwarding telephone number to the different content item, identifying, by the one or more processors, a subsequent telephone call from the user to the forwarding telephone number; and after reassigning the forwarding telephone number to the different content item and in response to identifying the subsequent telephone call from the user to the forwarding telephone number, connecting the user to the content sponsor of the content item rather than the different content sponsor of the different content item that is assigned the forwarding telephone number after the reassigning based on the stored association between the user, the forwarding telephone number, and the content sponsor of the content item in the data structure, including routing the subsequent telephone call to the telephone number of the content sponsor even though the forwarding telephone number has been reassigned to the different content item of the different content sponsor.

2. The method of claim 1 wherein the device is a mobile device.

3. The method of claim 1 wherein the content item is an advertisement.

4. The method of claim 1 wherein the control is a button that does not include a visible telephone number.

5. The method of claim 1 wherein the pool includes a plurality of forwarding telephone numbers which may or may not have been previously assigned to other content items but are now available for assignment.

6. The method of claim 1 wherein the interaction is a click and facilitating includes receiving a call from the user based on the interaction and connecting the received call to the telephone number of the sponsor of the content item.

7. The method of claim 1 wherein the identifier associated with the user is a telephone number of the user and wherein the method further includes receiving a call to the forwarding telephone number; identifying a caller number for the received call, determining whether the caller number is the same as the stored telephone number of the caller and when so, connecting the call to the telephone number of the sponsor of the content item.

8. A system comprising:
one or more processors; and
one or more memory elements including instructions that when executed cause the one or more processors to:
provide a data structure associated with a pool of forwarding telephone numbers, the forwarding telephone numbers being initially available for assigning to content items that are presented to users, wherein the data structure includes entries for forwarding telephone numbers that have been assigned in a previous time period and wherein an entry includes an identifier for a forwarding telephone number from the pool that was assigned based on an impression of a content item to a user, an identifier for the user, a telephone number of a content sponsor, and an identifier for the content sponsor for the content item, wherein the data structure includes plural entries for a same forwarding telephone number with each entry including a different combination of user and content sponsor identifiers;

identify an opportunity to deliver a content item to a user;

dynamically, by one or more processors, assign a telephone number from the pool of forwarding telephone numbers to the content item, wherein assigning includes evaluating by the one or more processors, the data structure to locate a given forwarding telephone number that has not been previously assigned to a combination of the user and a sponsor of the content item, and associating the forwarding telephone number with the content item;

receive an indication of a user interaction with a control that initiates a call to the given forwarding telephone number, wherein the received indication includes an identifier corresponding to a presentation of the content item on the device;

facilitate, based on the initiation of the call to the given forwarding telephone number, a call between the user and the content sponsor of the content item, wherein the call is initiated based on the user interaction and the call is initially made to the forwarding telephone number that was assigned to the content item, the facilitating including connecting the call to the forwarding number to the content sponsor at the telephone number of the content sponsor;

store, in the data structure based on the user interaction with the control, an association between the user, the assigned forwarding telephone number and the sponsor of the content item, wherein the association causes calls from the user to the forwarding telephone number to be routed to the telephone number of the content sponsor of the content item even after the assigned forwarding telephone number has been reassigned;

after storing the association, reassign the forwarding telephone number to a different content item provided by a different content sponsor;

after reassigning the forwarding telephone number to the different content item, identify, by the one or more processors, a subsequent telephone call from the user to the forwarding telephone number; and after reassigning the forwarding telephone number to the different content item and in response to identifying the subsequent telephone call from the user to the forwarding telephone number, connect the user to the content sponsor of the content item rather than the different content sponsor of the different content item that is assigned the forwarding telephone number after the reassigning based on the stored association between the user, the forwarding telephone number, and the content sponsor of the content item in the data structure, including routing the subsequent telephone call to the telephone number of the content sponsor even though the forwarding telephone number has been reassigned to the different content item of the different content sponsor.

9. The system of claim 8 wherein the control is a button that does not include a visible telephone number.

10. The system of claim 8 wherein the pool of telephone numbers includes a plurality of telephone numbers which may or may not have been previously assigned to other content items but are now available for assignment.

11. A non-transitory computer-readable storage device comprising instructions that, when executed by a processor, cause the processor to:
provide a data structure associated with a pool of forwarding telephone numbers, the forwarding telephone numbers being initially available for assigning to content items that are presented to users, wherein the data structure includes entries for forwarding telephone numbers that have been assigned in a previous time period and wherein an entry includes an identifier for a forwarding telephone number from the pool that was assigned based on an impression of a content item to a user, an identifier for the user, a telephone number of a content sponsor, and an identifier for the content sponsor for the content item, wherein the data structure includes plural entries for a same forwarding telephone number with each entry including a different combination of user and content sponsor identifiers;
identify an opportunity to deliver a content item to a user;
dynamically, by one or more processors, assign a forwarding telephone number from the pool of forwarding telephone numbers to the content item, wherein assigning includes evaluating by the one or more processors, the data structure to locate a given forwarding telephone number that has not been previously assigned to a combination of the user and a content sponsor of the content item, and associating the forwarding telephone number with the content item;
receive an indication of a user interaction with a control that initiates a call to the given forwarding telephone number, wherein the received indication includes an identifier corresponding to a presentation of the content item on the device;
facilitate, based on the initiation of the call to the given forwarding telephone number, a call between the user and the content sponsor of the content item, wherein the call is initiated based on the user interaction and the call is initially made to the forwarding telephone number that was assigned to the content item, the facilitating including connecting the call to the forwarding number to the content sponsor at the telephone number of the content sponsor;
store, in the data structure based on the user interaction with the control, an association between the user, the assigned forwarding telephone number and the sponsor of the content item, wherein the association causes calls from the user to the forwarding telephone number to be routed to the telephone number of the content sponsor of the content item even after the assigned forwarding telephone number has been reassigned;
after storing the association, reassign the forwarding telephone number to a different content item provided by a different content sponsor;
after reassigning the forwarding telephone number to the different content item, identify, by the one or more processors, a subsequent telephone call from the user to the forwarding telephone number; and
after reassigning the forwarding telephone number to the different content item and in response to identifying the subsequent telephone call from the user to the forwarding telephone number, connect the user to the content sponsor of the content item rather than the different content sponsor of the different content item that is assigned the forwarding telephone number after the reassigning based on the stored association between the user, the forwarding telephone number, and the content sponsor of the content item in the data structure, including routing the subsequent telephone call to the telephone number of the content sponsor even though the forwarding telephone number has been reassigned to the different content item of the different content sponsor.

12. The computer-readable storage device of claim 11 wherein the control is a button that does not include a visible telephone number.

13. The computer-readable storage device of claim 11 wherein the pool includes a plurality of forwarding telephone numbers which may or may not have been previously assigned to other content items but are now available for assignment.

* * * * *

UNITED STATES PATENT AND TRADEMARK OFFICE
CERTIFICATE OF CORRECTION

| | |
|---|---|
| PATENT NO. | : 10,986,224 B2 |
| APPLICATION NO. | : 15/065439 |
| DATED | : April 20, 2021 |
| INVENTOR(S) | : Agrawal et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 665 days.

Signed and Sealed this
Twenty-fifth Day of October, 2022

*Katherine Kelly Vidal*

Katherine Kelly Vidal
*Director of the United States Patent and Trademark Office*